US007133657B2

(12) United States Patent
Kuenen et al.

(10) Patent No.: US 7,133,657 B2

(45) Date of Patent: Nov. 7, 2006

(54) CHANNEL CALIBRATOR FOR USE WITH A QUADRATURE MIXING RECEIVER AND A METHOD OF OPERATION THEREOF

(75) Inventors: Jeroen C. Kuenen, Enschede (NL); Xiao-Jiao Tao, Losser (NL)

(73) Assignee: Agere Systems Inc., Allentown, PA (US)

( * ) Notice: Subject to any disclaimer, the term of this patent is extended or adjusted under 35 U.S.C. 154(b) by 459 days.

(21) Appl. No.: 10/255,235

(22) Filed: Sep. 26, 2002

(65) Prior Publication Data

US 2004/0063416 A1 Apr. 1, 2004

(51) Int. Cl.
*H04B 1/30* (2006.01)

(52) U.S. Cl. ..................... 455/324; 455/303; 325/231; 325/235

(58) Field of Classification Search ................ 455/296, 455/313, 323, 67.11, 73, 138, 234.1, 324, 455/326, 240.1, 302, 63.1, 136; 325/261, 325/317, 345, 324, 225, 281, 284, 233, 232, 325/326, 231–235

See application file for complete search history.

(56) References Cited

U.S. PATENT DOCUMENTS

| | | | | |
|---|---|---|---|---|
| 5,235,424 | A * | 8/1993 | Wagner et al. | 348/678 |
| 5,721,756 | A * | 2/1998 | Liebetreu et al. | 375/344 |
| 5,812,927 | A * | 9/1998 | Ben-Efraim et al. | 725/70 |
| 6,222,878 | B1 * | 4/2001 | McCallister et al. | 375/225 |
| 6,307,902 | B1 * | 10/2001 | Walley | 375/345 |
| 6,442,217 | B1 * | 8/2002 | Cochran | 375/326 |
| 6,493,381 | B1 * | 12/2002 | Werner et al. | 375/232 |
| 6,760,577 | B1 * | 7/2004 | Li | 455/323 |
| 6,842,489 | B1 * | 1/2005 | Masenten | 375/261 |
| 6,940,916 | B1 * | 9/2005 | Warner et al. | 375/261 |
| 2002/0097812 | A1 * | 7/2002 | Wiss | 375/316 |
| 2003/0174641 | A1 * | 9/2003 | Rahman | 370/206 |
| 2003/0206603 | A1 * | 11/2003 | Husted | 375/324 |

OTHER PUBLICATIONS

"Direct-Conversion Radio Transceivers for Digital Communications" by Asad A. Abidi; IEEE Journal of Solid-State Circuits, vol. 30, No. 12, Dec. 1995; pp. 1399-1410.

"Advanced Methods for I/Q Imbalance Compensation in Communication Receivers" by Mikko Valkama, et al.; IEEE Transactions on Signal Processing, vol. 49, No. 10; Oct. 2001; pp. 2335-2344.

"Adaptive IIR Filtering" by John J. Shynk; IEEE ASSP Magazine; Apr. 1989; 21 pages.

"Convergence Analysis of the Sign Algorithm Without the Independence and Gaussian Assumptions" by Eweda Eweda; IEEE Transactions on Signal Processing, vol. 48, No. 9; Sep. 2000; pp. 2535-2544.

"Frequency Dependent I/Q Imbalance Calibration" by Xiao-Jiao Tao; WADN091, Oct. 9, 2001; 24 pages.

"Implementation of Frequency Dependent I/Q Imbalance Calibration" by Xiao-Jiao Tao; WADN126; Feb. 8, 2002; 8 pages.

"Hooks in Jade for Calibration" by Jeroen Kuenen; Design Notes; Sep. 28, 2001; 8 pages.

* cited by examiner

*Primary Examiner*—Edward F. Urban
*Assistant Examiner*—Blane J. Jackson

(57) ABSTRACT

The present invention is directed to a channel calibrator and a method of calibrating in-phase and quadrature phase channels for use with a quadrature mixing receiver. In one embodiment, the channel calibrator includes a balancer and an equalizer. The balancer reduces frequency dependent imbalance between an in-phase channel and a quadrature phase channel associated with the receiver. The equalizer decreases frequency independent mismatch between the in-phase channel and the quadrature phase channel.

21 Claims, 5 Drawing Sheets

DATA SIGNAL 100 110 120 130 RF FRONT END BASEBAND SIGNAL PROCESSOR CHANNEL CALIBRATOR 111 140 115 118 121 124 150 127 $I$ $I_c$ 113 114 0° OSC LNA 90° 122 125 160 128 LPF VGA A/D $Q$ $Q_c$ BALANCER ICKT EQUAL DATA PROCESSOR DATA COMMUNICATION 116 119 132 134 136

CHANNEL CALIBRATOR FOR USE WITH A QUADRATURE MIXING RECEIVER AND A METHOD OF OPERATION THEREOF

TECHNICAL FIELD OF THE INVENTION

The present invention is directed, in general, to communications systems and, more specifically, to a channel calibrator and a method of calibrating an in-phase and quadrature phase channel for use with a quadrature mixing receiver.

BACKGROUND OF THE INVENTION

The exchange of information through wireless communications systems continues to grow with the increase of pagers, cellular telephones, wireless local area networks (WLANs) and other wireless communication devices and networks. A majority of the wireless communications systems include a transmitter and a receiver using a superheterodyne architecture employing a low intermediate frequency (IF). In a low IF superheterodyne receiver, a received radio frequency (RF) signal is downconverted to a low IF by two mixers driven by quadrature phases of a local oscillator. Instead of using a low IF, some wireless communications systems may use a zero IF or direct conversion architecture which also employs quadrature mixing. For more information regarding zero IF receivers, see Asad A. Abidi, *Direct-conversion Radio Transceivers for Digital Communications,* IEEE Journal of Solid-State Circuits, Vol 30, No. 12, December 1995 at 1399, which is incorporated herein by reference.

Nevertheless, both low IF and zero IF receivers employ quadrature mixing and should address a common problem of matching or balancing the amplitudes and phases of an in-phase and quadrature phase branch, or channel, of the received RF signal. The mismatch between the two channels may be the result of bipolar transistors, MOS transistors and finite tolerances of capacitor and resistor values used to implement the analog components of the receiver. While balanced channels in a quadrature mixing receiver correspond to a pure frequency translation, any mismatches introduce a frequency translation that results in a mixture of an image and a desired signal when the in-phase and quadrature phase channels of the received RF signal are not exactly 90 degrees out of phase, and the image is seen as interference.

In Mikko Valkama, et al., *Advanced Methods for I/Q Imbalance Compensation in Communication Receivers,* IEEE Transactions on Signal Processing, Volume 49, NO. 10, Oct. 2001, at 2335, which is incorporated herein by reference, several methods have been proposed for imbalance compensation for in-phase and quadrature phase channels using baseband digital signal processing. One suggested method involves a structure based on a traditional adaptive interference canceller. Improved image rejection may also be obtained by using advanced blind source separation techniques, which do not require known training signals.

The proposed image rejection methods, however, concentrate on an application wherein the receiver imbalance properties are solely frequency independent. Nevertheless, image rejection in quadrature mixing receivers is also created by frequency dependent sources. Addressing both frequency dependent and independent causes of image rejection in quadrature receivers increases the complexity of a solution. The suggested methods of imbalance compensation either require complex and expensive structures or do not sufficiently reduce the imbalance between the in-phase and the quadrature phase channels of quadrature mixing receivers. Furthermore, the suggested methods of imbalance compensation do not sufficiently address the degradation of the signal-to-noise ratio of the received RF signal for higher data rates of, for instance, 54 Mbits/s and up.

Accordingly, what is needed in the art is an improved system and method for reducing a degradation in the performance of quadrature mixing receivers including a reduction in the image rejection associated therewith.

SUMMARY OF THE INVENTION

To address the above-discussed deficiencies of the prior art, the present invention provides a channel calibrator for use with a quadrature mixing receiver. In one embodiment, the channel calibrator includes a balancer and an equalizer. The balancer is configured to reduce frequency dependent imbalance between an in-phase channel and a quadrature phase channel associated with the receiver. The equalizer is configured to decrease frequency independent mismatch between the in-phase channel and the quadrature phase channel.

In another aspect, the present invention provides a method of calibrating in-phase and quadrature phase channels in a quadrature mixing receiver. The method includes separating sources of frequency dependent imbalance and frequency independent mismatch of the receiver, reducing the frequency dependent imbalance, and decreasing the frequency independent mismatch.

The present invention also provides, in yet another aspect, a quadrature mixing receiver for use with a wireless communications system. The quadrature mixing receiver includes a radio frequency front end, a baseband signal processor and a channel calibrator. The channel calibrator includes a balancer that reduces frequency dependent imbalance between an in-phase channel and a quadrature phase channel associated with the receiver and an equalizer that decreases frequency independent mismatch between the in-phase channel and the quadrature phase channel.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
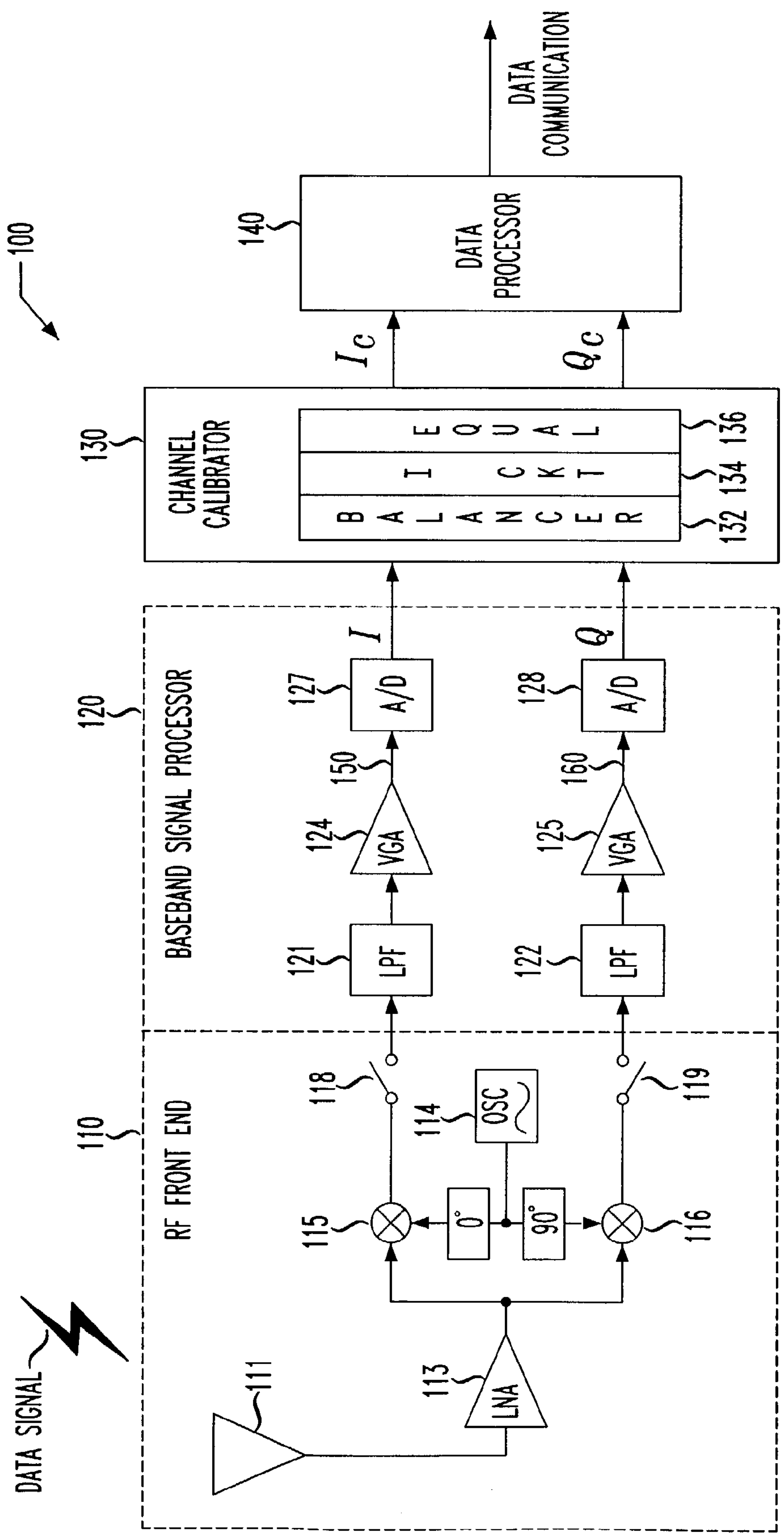
FIG. 1 illustrates a system diagram of an embodiment of a quadrature mixing receiver constructed in accordance with the principals of the present invention.

Referring initially to FIG. 1, illustrated is a system diagram of an embodiment of a quadrature mixing receiver, generally designated 100, constructed in accordance with the principals of the present invention. The quadrature mixing receiver 100 includes a radio frequency (RF) front end 110, a baseband signal processor 120, a channel calibrator 130, a data processor 140, and employs an in-phase channel 150 and a quadrature phase channel 160. The RF front end 110 includes an antenna 111, a low noise amplifier (LNA) 113, an oscillator 114, a first mixer 115, a second mixer 116, a first switch 118 and a second switch 119.

The baseband signal processor 120 includes first and second baseband lowpass filters 121, 122, first and second voltage gain amplifiers (VGAs) 124, 125, a first analog to digital (A/D) converter 127 and a second A/D converter 128. The channel calibrator includes a balancer 132, an isolation circuit 134 and an equalizer 136. Additionally, one skilled in the art will understand that the quadrature mixing receiver 100 may include other components common to a conventional quadrature mixing receiver such as additional filtering for the in-phase channel 150 and the quadrature phase channel 160 associated therewith.

The RF front end 110 downconverts a data signal and splits the data signal into an in-phase data signal I and a quadrature phase data signal Q. The antenna 111 may be a standard antenna common to quadrature mixing receivers including a superheterodyne or a homodyne receiver. For example, the antenna 111 may receive a data signal at a frequency and rate as defined by The Institute of Electrical and Electronics Engineers (IEEE) Standard 802.11, which is incorporated herein by reference. The data signal may be a modulated data communication intended for wireless communications. In a preferred embodiment, the antenna may receive the data signal through Orthogonal Frequency Division Multiplexing (OFDM) modulation at a frequency of about five GHz with a data rate up to 54 Mbits/s as defined by IEEE Standard 802.11a.

The LNA 113 may be a standard low noise amplifier that amplifies the received data signal. The oscillator 114, the first mixer 115 and the second mixer 116 may be conventional components typically used within a standard quadrature mixing receiver. The oscillator 114, the first mixer 115 and the second mixer 116 may be employed to downconvert the amplified data signal into two channels, an in-phase channel and a quadrature phase channel. The first mixer 115 and the second mixer 116 multiply the amplified data signal with two reference signals from the oscillator 114. The first mixer 115 multiplies an in-phase reference signal from the oscillator 114 with the amplified data signal to produce the in-phase data signal I. The second mixer 116 multiplies a quadrature phase reference signal from the oscillator 114 with the amplified signal to produce the quadrature phase data signal Q.

Preferably, the in-phase reference signal and the quadrature phase reference signal have equal amplitudes and a phase difference of 90 degrees. Due to variables, however, such as manufacturing imperfections and component tolerances, obtaining a quadrature phase reference signal with a 90 degree phase difference compared to the in-phase reference signal is generally unobtainable. The in-phase channel 150 and the quadrature phase channel 160, therefore, should be calibrated properly in both amplitude and phase response to prevent the quadrature phase data signal from generating an image on the in-phase data signal.

The first switch 118 and the second switch 119 may be conventional switches that separate the RF front end 110 from the baseband signal processor 120. During normal operation of the quadrature mixing receiver 100, the first switch 118 and the second switch 119 are closed to connect the RF front end 110 and the baseband signal processor 120. During calibration, the first switch 118 and the second switch 119 may separate the RF front end 110 and the baseband signal processor 120 allowing balancing of the frequency dependent imbalance sources separate from equalizing the frequency independent mismatch sources. By separating the RF front end 110 and the baseband signal processor 120 during calibration, the calibration process is less complex and more efficient than existing in-phase and quadrature phase channel calibration systems and methods.

The baseband signal processor 120 selects the baseband frequency of the received data signal by filtering the in-phase data signal I and the quadrature phase data signal Q and converting the in-phase data signal I and the quadrature phase data signal Q to digital signals. The first and second baseband lowpass filters 121, 122, may be conventional low pass filters that select the baseband frequency of the in-phase data signal I and the quadrature phase data signal Q. The VGAs 124, 125, are conventional variable gain amplifiers which amplify the in-phase data signal I and the quadrature phase data signal Q. The first A/D converter 127 and the second A/D converter 128 are conventional analog to digital converters that convert the in-phase data signal I and the quadrature phase data signal Q from analog signals to digital signals.

The channel calibrator 130 receives the in-phase data signal I and the quadrature phase data signal Q from the first A/D converter 127 and the second A/D converter 128, respectively. In an advantageous embodiment, the channel calibrator 130 is employed within a digital signal processor (DSP). The channel calibrator 130 calibrates the in-phase channel 150 and the quadrature phase channel 160 of the quadrature mixing receiver 100 producing a calibrated in-phase data signal $I_c$ and a calibrated quadrature phase data signal $Q_c$. The balancer 132 reduces (e.g., cancels or substantially cancels) a frequency dependent imbalance between the in-phase channel 150 and the quadrature phase channel 160 of the quadrature mixing receiver 100. The equalizer 136 decreases (e.g., removes or substantially removes) a frequency independent mismatch between the in-phase channel 150 and the quadrature phase channel 160. The isolation circuit 134, coupled to the balancer 132 and the equalizer 136, separates the balancer 132 and the equalizer 136. During normal operation of the quadrature mixing receiver 100, the isolation circuit 134 connects the balancer 132 to the equalizer 136.

During a portion of calibration, the isolation circuit 134 separates the balancer 132 from the equalizer 136. More specifically, the isolation circuit 134 separates the balancer 132 from the equalizer 136 when the in-phase channel 150 and the quadrature phase channel 160 are being calibrated due to frequency dependent imbalance sources of the quadrature mixing receiver 100. The operation of the isolation circuit 134 along with the balancer 132 and the equalizer 136 will be discussed in more detail below.

The data processor 140 receives the calibrated in-phase data signal $I_c$ and the calibrated quadrature phase data signal $Q_c$ from the equalizer 136 of the channel calibrator 130. The data processor 140 may demodulate and process the calibrated in-phase data signal $I_c$ and the calibrated quadrature phase data signal $Q_c$ to determine the data communication. The data processor 140 may be employed within a digital signal processor. One skilled in the art will understand the demodulating and processing of digital data signals within a receiver. For general information regarding the operation of receivers such as a quadrature mixing receiver, refer to J. Proakis, *Digital Signal Processing: Principles, Algorithms and Applications,* Prentice-Hall Inc., 1996, which is incorporated herein by reference in its entirety.

Figure 2:
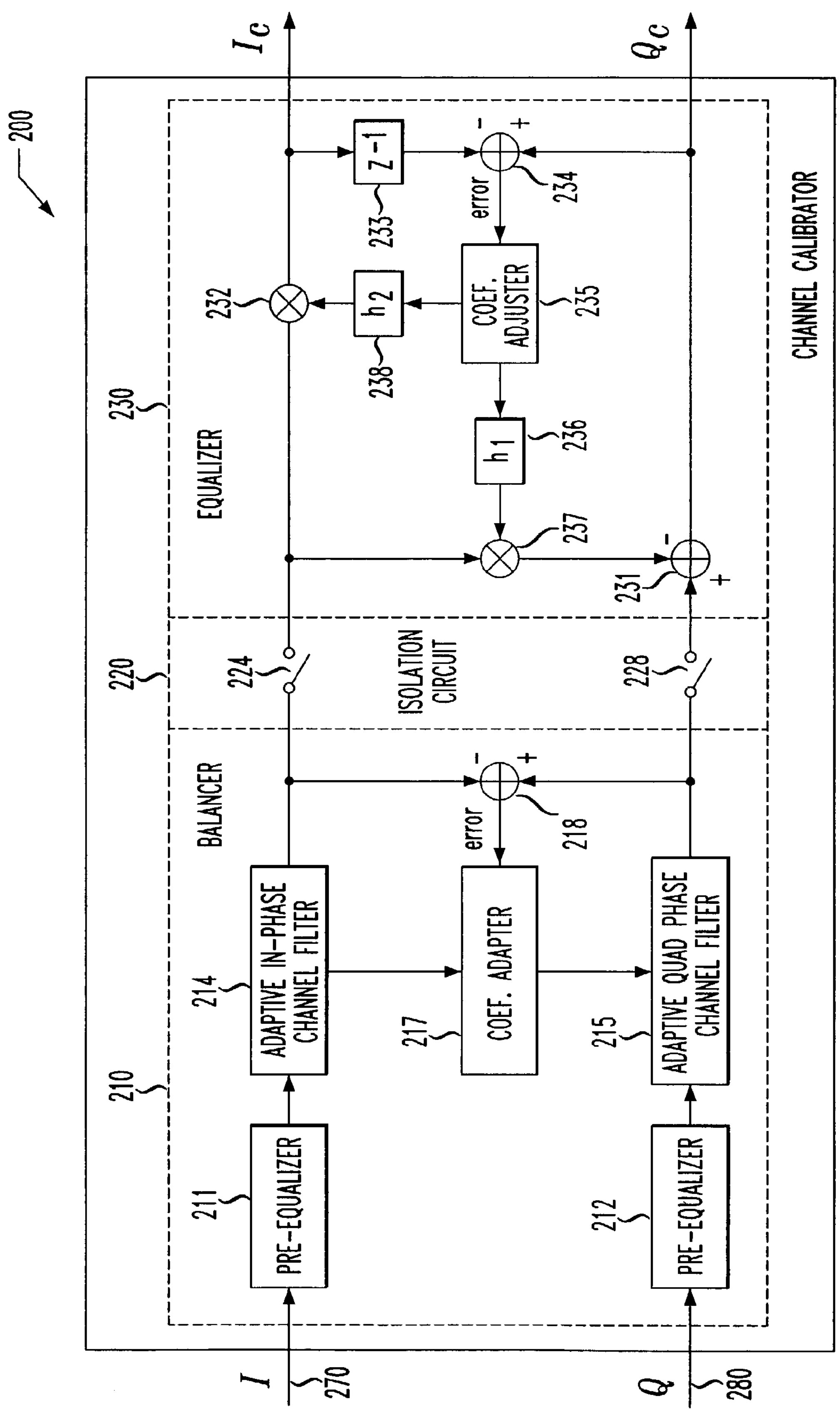
FIG. 2 illustrates a block diagram of an embodiment of a channel calibrator constructed in accordance with the principals of the present invention.

Turning now to FIG. 2, illustrated is a block diagram of an embodiment of a channel calibrator, generally designated 200, constructed in accordance with the principals of the present invention. The channel calibrator 200 includes a balancer 210, an isolation circuit 220, an equalizer 230, and employs an in-phase channel 270 and a quadrature phase channel 280. The balancer 210 includes first and second pre-equalizers 211, 212, an adaptive in-phase channel filter 214, an adaptive quadrature phase channel filter 215, a coefficient adapter 217 and a corrector 218. The isolation circuit 220 includes an in-phase channel switch 224 and a quadrature phase channel switch 228. The equalizer 230 includes a quadrature phase channel summer 231, an in-phase channel multiplier 232, a delay element 233, an error summer 234, a coefficient adjuster 235, a first filter coefficient generator 236, a multiplier 237 and a second filter coefficient generator 238.

The balancer 210 reduces (e.g., cancels or substantially cancels) a frequency dependent imbalance between the in-phase channel 270 and the quadrature phase channel 280 associated with a quadrature mixing receiver. Typically, sources of frequency dependent imbalance are the baseband processing components of the quadrature mixing receiver. This is especially true with a zero intermediate frequency (IF) receiver wherein the ratio between the highest and the lowest frequency is relatively high. In one embodiment, the balancer 210 employs adaptive infinite-impulse-response (IIR) filtering. In a preferred embodiment, the balancer 210 employs an equation error approach to IIR filtering as discussed in John J. Shynk, *Adaptive IIR Filtering,* IEEE ASSP, April 1989, at 5, which is incorporated herein by reference. In addition, the balancer 210 may also employ a sign algorithm as described in E. Eweda, *Convergence Analysis of the Sign Algorithm Without the Independence and Gaussian Assumptions,* IEEE Trans. Signal Processing, Vol. 48, No 9, September 2000, at 2535, which is incorporated herein by reference.

The first and second pre-equalizers 211, 212, provide pre-equalization of the in-phase channel 270 and the quadrature phase channel 280. In one embodiment, the first and second pre-equalizers 211, 212, may be conventional finite-impulse-response (FIR) filters. In a preferred embodiment, the first and second pre-equalizers 211, 212, are linear phase FIR filters with multiple (e.g., 15) taps. One skilled in the pertinent art will understand the operation of linear phase FIR filters.

The adaptive in-phase channel filter 214 provides an adaptive balancing for the in-phase channel 270. In a preferred embodiment, the adaptive in-phase channel filter 214 is an adaptive FIR filter having an order greater than that of an analog low-pass filter employed by a baseband signal processor. For example, the adaptive in-phase channel filter 214 may be a nine tap adaptive FIR filter and the first and second baseband lowpass filters 121, 122, of the baseband signal processor 120 of FIG. 1 may be lowpass filters with an order of six. The adaptive quadrature phase channel filter 215 provides an adaptive balancing for the quadrature phase channel 280. In a preferred embodiment, the adaptive quadrature phase channel filter 215 is an adaptive FIR filter having an order equivalent to an order of the in-phase channel filter 214 with a first tap having a fixed-value without adaptation. For example, the adaptive quadrature phase channel filter 215 may be a nine tap adaptive FIR filter with a first fixed tap. More information on an adaptive FIR filter is discussed below.

The coefficient adapter 217 employs an adaptive algorithm to adjust the filter coefficients of the adaptive in-phase channel filter 214 and the adaptive quadrature phase channel filter 215 in order to reduce the error between the in-phase channel 270 and the quadrature phase channel 280. In one embodiment, the coefficient adapter 217 employs an adaptive IIR algorithm as discussed in *Adaptive IIR Filtering.* In a preferred embodiment, the coefficient adapter 217 employs the sign algorithm. The coefficient adapter 217 receives a feedback error signal from the corrector 218 and employs it to adapt the filter coefficients for the adaptive in-phase channel filter 214 and the adaptive quadrature phase channel filter 215. The corrector 218 produces the feedback error signal by summing a quadrature phase data signal Q with a negative of an in-phase data signal I.

The isolation circuit 220 is coupled to the balancer 210 and the equalizer 230 through the in-phase channel 270 and the quadrature phase channel 280. The isolation circuit 220 employs the in-phase channel switch 224 and the quadrature phase channel switch 228 to separate the balancer 210 and the equalizer 230 during a portion of calibration. In one embodiment, the in-phase channel switch 224 and the quadrature phase channel switch 228 may be conventional switches for digital signals. During normal operation of the channel calibrator 200, the in-phase channel switch 224 and the quadrature phase channel switch 228 are closed and the balancer 210 and the equalizer 230 are connected. The operation of the isolation circuit 220 will be discussed in more detail below.

The equalizer 230 decreases (e.g., removes or substantially removes) a frequency independent mismatch between the in-phase channel 270 and the quadrature phase channel 280 employing, for instance, a two tap adaptive FIR filter. In addition, the equalizer 230 may employ a sign algorithm. Typically, the frequency independent mismatch between the in-phase channel 270 and the quadrature phase channel 280 results from the downconversion components of a typical quadrature mixing receiver. The quadrature phase channel summer 231 of the equalizer 230 may be a standard summer which adds the quadrature phase data signal Q with a negative of the first filter coefficient provided by the first filter coefficient generator 236 multiplied with the in-phase data signal I. The resulting output of the quadrature phase channel summer 231 is a calibrated quadrature phase data signal $Q_c$. The in-phase channel multiplier 232 is a standard multiplier which multiplies the in-phase data signal I with the second filter coefficient provided by the second filter coefficient generator 238. The resulting output of the in-phase channel multiplier 232 is a calibrated in-phase data signal $I_c$.

The delay element 233 provides a standard time delay that delays the calibrated in-phase data signal $I_c$ by one sample. The error summer 234 is a conventional summer that adds the calibrated quadrature phase data signal $Q_c$ with a negative of the calibrated in-phase data signal $I_c$ which has been delayed by the delay element 233. The error summer 234 produces a feedback error from the addition that is sent to the coefficient adjuster 235. The coefficient adjuster 235 employs an adaptive algorithm to adjust the first filter coefficient and the second filter coefficient in order to decrease a mismatch between the in-phase channel 270 and the quadrature phase channel 280 caused by the frequency independent imbalance sources. In a preferred embodiment, the coefficient adjuster 235 includes an adaptive IIR algorithm as discussed in *Adaptive IIR Filtering*. One skilled in the art will understand adaptive IIR algorithms. In one embodiment, the coefficient adjuster 235 may employ an adaptive IIR algorithm similar to one employed by the coefficient adapter 217 discussed above.

The first filter coefficient and the second filter coefficient are adjusted based on the feedback error from the error summer 234 and the coefficient adjuster 235. The multiplier 237 is a conventional multiplier that multiplies the first filter coefficient with the in-phase data signal I.

Figure 3:
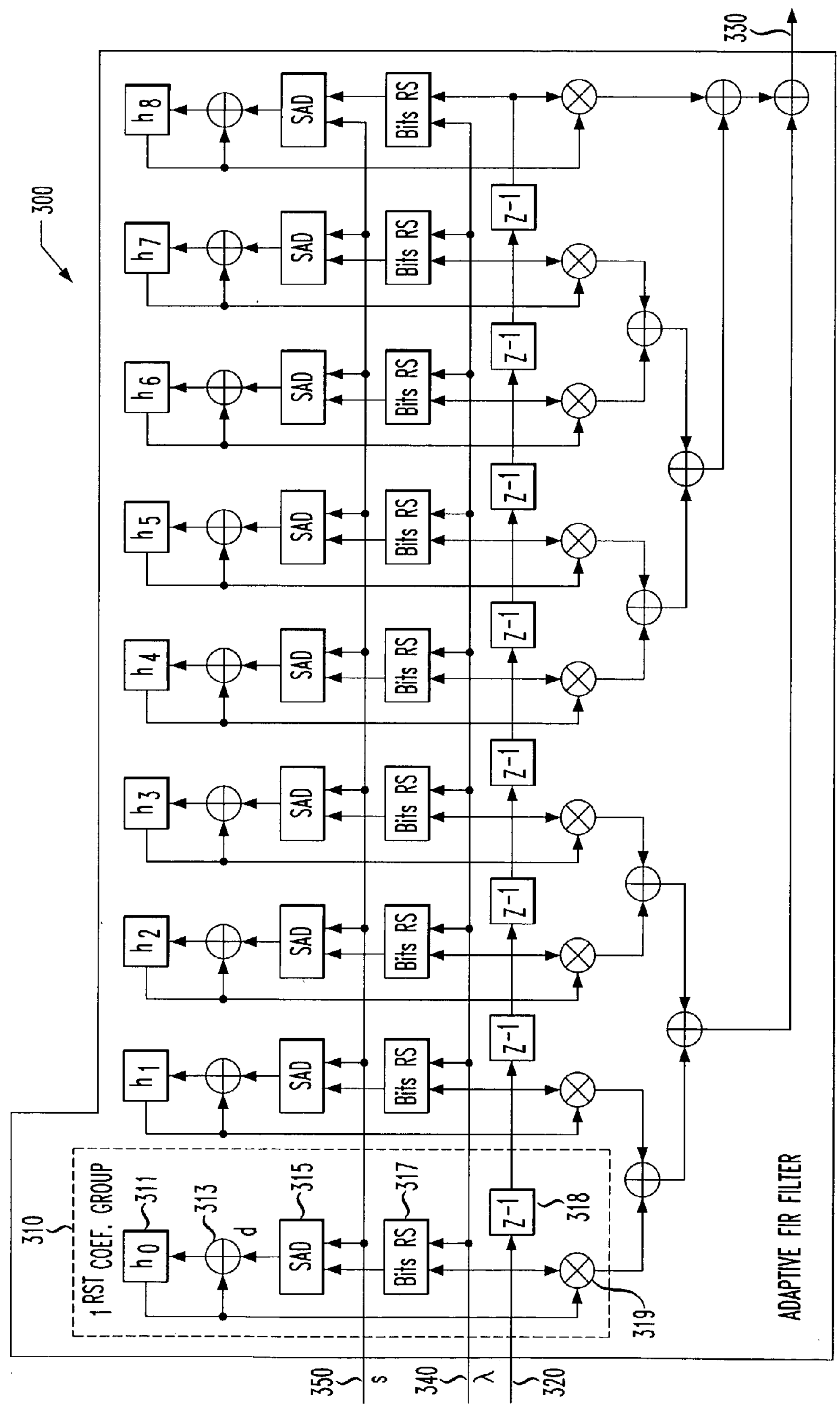
FIG. 3 illustrates a block diagram of an embodiment of an adaptive finite-impulse-response (FIR) filter which may be employed within a channel calibrator.

Turning now to FIG. 3, illustrated is a block diagram of an embodiment of an adaptive FIR filter, generally designated 300, which may be employed within a channel calibrator. The adaptive FIR filter 300 is a nine tap adaptive FIR filter. Of course, one skilled in the pertinent art will understand that other adaptive FIR filters may be employed in the present invention. The adaptive FIR filter 300 includes a first coefficient group 310, a data-in path 320, a data-out path 330, a step-size line 340 and a sign line 350. The first coefficient group 310 includes a first coefficient generator 311, a summer 313, a sign bit access controlled data output (SAD) 315, a right-shift function block 317, a delay element 318 and a multiplier 319. The first coefficient group 310 represents second to eighth coefficient groups that are not denoted or discussed.

The data-in path 320 provides a path for a digital data signal such as the in-phase data signal discussed above with respect to FIG. 2. The digital data signal is received by the right-shift function block 317, the delay element 318 and the multiplier 319. The right-shift function block 317 receives the digital data signal and a step-size signal λ from the step-size line 340. The right-shift function block 317 controls right shifting of the digital data signal according to the step-size signal λ. The output of the right-shift function block 317 may be represented by right-shift output signal y where y=(digital data signal)$2^{-\lambda}$.

The SAD 315 receives the right-shift output signal y from the right-shift function block 317 and a sign bit, s, from the sign line 350. The SAD 315 is an access controlled data output function block which produces an output SAD output signal d, with d=sy. The sign bit s equals one, zero or negative one. Therefore, d=y if s>0, d=−y if s<0 and d=0 if s=0.

The summer 313 is a conventional summer that adds the SAD output signal d of the SAD 315 with a first coefficient $h_0$ provided by the first coefficient generator 311. The result of the addition is input into the first coefficient generator 311. The first coefficient $h_0$ is fed back into the summer 313 and also into the multiplier 319. The multiplier 319 multiplies the first coefficient $h_0$ with the digital data signal from data-in path 320. The output from the multiplier 319 is added with the outputs from the multipliers of other coefficient groups within the adaptive FIR filter 300 to eventually deliver a data-out signal via the data-out path 330.

The step-size line 340 is the output of a step-size generator. The step-size signal λ may be determined from Table 1 listed below. The step-size signal λ and the sign bits may be determined by the coefficient adapter 217 illustrated in FIG. 2.

TABLE 1

$$\lambda = \begin{cases} 7, & t = 0 \sim T_t/12 \\ 8, & t = T_1/12 \sim 2T_1/12 \\ 9, & t = 2T_1/12 \sim 3T_1/12 \\ 10, & t = 3T_1/12 \sim 4T_1/12 \\ 11, & t = 4T_1/12 \sim 5T_1/12 \\ 12, & t = 5T_1/12 \sim 6T_1/12 \\ 13, & t = 6T_1/12 \sim 7T_1/12 \\ 14, & t = 7T_1/12 \sim 8T_1/12 \\ 15, & t = 8T_1/12 \sim 9T_1/12 \\ 16, & t = 9T_1/12 \sim 10T_1/12 \\ 17, & t = 10T_1/12 \sim 11T_1/12 \\ 18, & t = 11T_1/12 \sim 12T_1/12 \end{cases}$$

Figure 4:
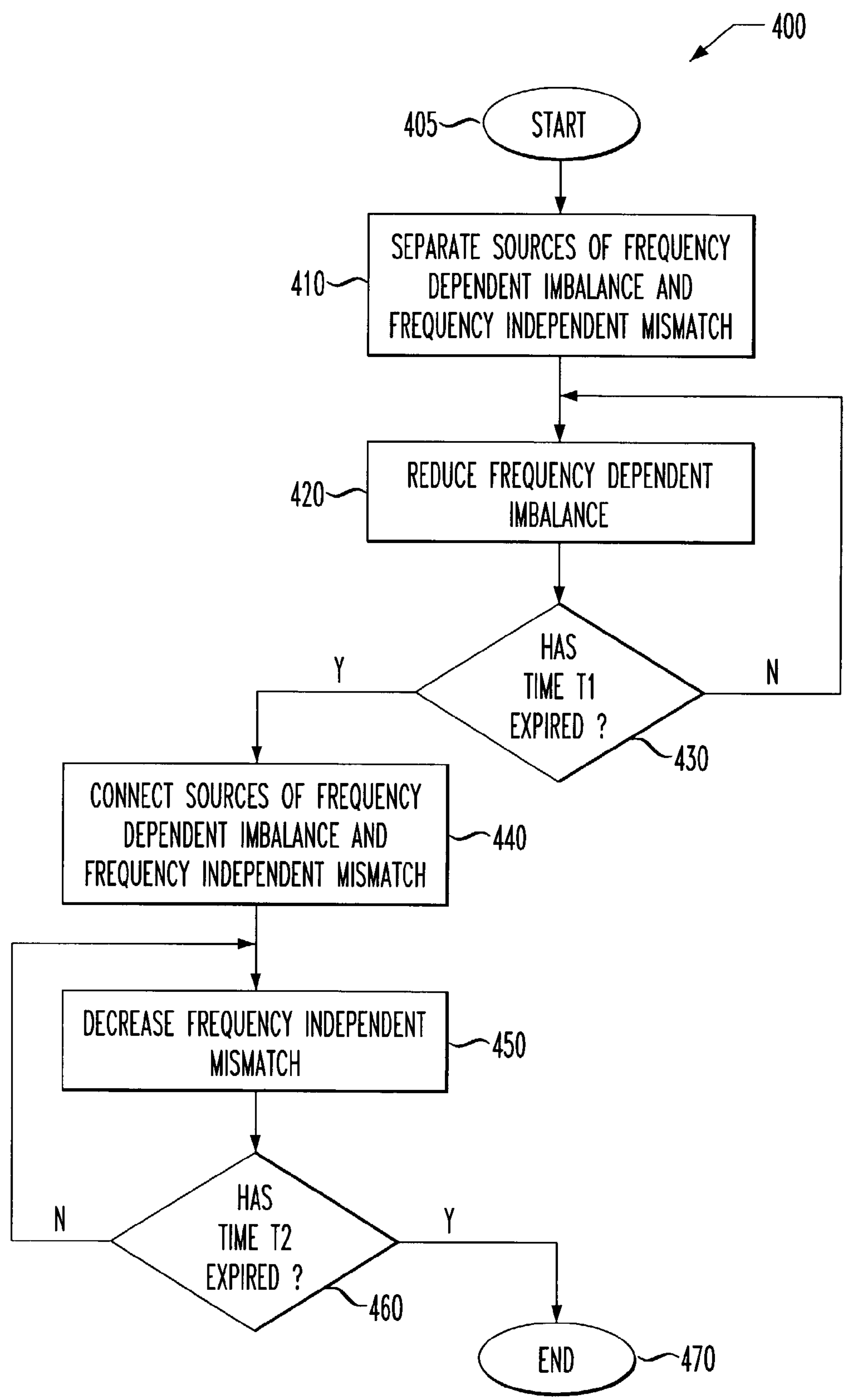
FIG. 4 illustrates a flow diagram of an embodiment of a method of calibrating in-phase and quadrature phase channels of a quadrature mixing receiver, in accordance with the principals of the present invention.

Turning now to FIG. 4, illustrated is a flow diagram of an embodiment of a method, generally designated 400, of calibrating in-phase and quadrature phase channels of a quadrature mixing receiver. The method 400 starts in a step 405 with an intent to calibrate an in-phase and a quadrature phase channel.

After starting, sources of frequency dependent imbalance of the receiver are separated from sources of frequency independent mismatch of the receiver in a step 410. In a preferred embodiment, the sources of frequency dependent imbalance and frequency independent mismatch are separated by switches such as the first switch 118 and the second switch 119 discussed above with respect to FIG. 1.

After separating, the sources of frequency dependent imbalance are reduced (e.g., cancelled or substantially cancelled) in a step 420. In a preferred embodiment, the sources of frequency dependent imbalance are reduced employing a channel calibrator as discussed above with respect to FIG. 2. The channel calibrator may be trained using a configuration as illustrated in FIG. 5.

Figure 5:
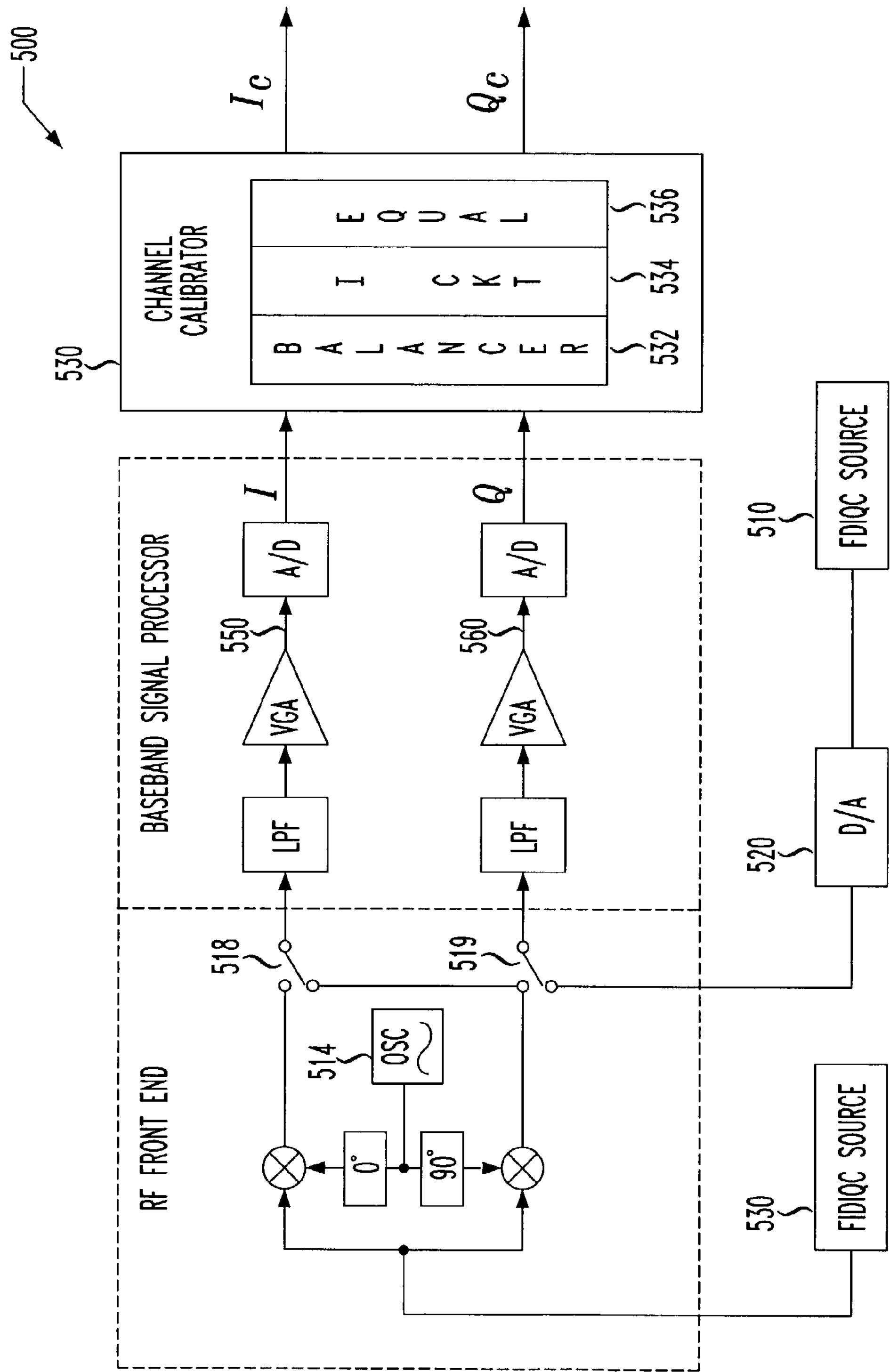
FIG. 5 illustrates a block diagram of representative sections of an embodiment of a quadrature mixing receiver configured for calibration in accordance with the principles of the present invention.

Turning now to FIG. 5, illustrated is a block diagram of representative sections of an embodiment of a quadrature mixing receiver 500 that calibrates in accordance with the principles of the present invention. In addition to the RF front end 110, the baseband signal processor 120 and the channel calibrator 130 of the quadrature mixing receiver 100 of FIG. 1, the quadrature mixing receiver 500 of FIG. 5 also includes a frequency dependent in-phase/quadrature phase calibration (FDIQC) source 510, a digital to analog (D/A) converter 520, and a frequency independent in-phase/quadrature phase calibration (FIIQC) source 530.

The FDIQC source 510 may provide a digital signal having a bandwidth which is about full. In a preferred embodiment, the FDIQC source 510 may be a periodical band-limited and peak-to-average-power-ratio (PAPR) optimally minimized signal source. In some embodiments, the FDIQC source 510 may be generated from a read-only memory table and a digital portion of a transmitter section of a transceiver that includes the quadrature mixing receiver 500. The D/A converter 520 receives the FDIQC source 510 and applies the analog FDIQC source 510 to both an in-phase channel 550 and the quadrature phase channel 560 through the opened first switch 518 and the opened second switch 519. In one embodiment, the D/A converter 520 may be a conventional D/A converter from a transmitter section of a transceiver that includes the quadrature mixing receiver 500.

A balancer 532 of a channel calibrator 530 of the quadrature mixing receiver 500 receives the FDIQC source 510 through the in-phase channel 550 and the quadrature phase channel 560. An adaptive algorithm, such as the algorithm employed by the coefficient adapter 217 of FIG. 2, compares the FDIQC source 510 through the in-phase channel 550 and the quadrature phase channel 560 and substantially removes the channel imbalance by adapting the appropriate coefficient values for adaptive filters of each channel. In a preferred embodiment, the adaptive algorithm is the sign algorithm. The adaptive filters of each channel may be the adaptive in-phase channel filter 214 and the adaptive quadrature phase channel filter 215 of FIG. 2.

Returning now to the method 400 of FIG. 4 and with continuing reference to the quadrature mixing receiver 500 of FIG. 5, after reducing, a determination is made if a time T1 has expired in a first decisional step 430. T1 may be determined based on the time required for the balancer 532 to calibrate the in-phase channel 550 and the quadrature phase channel 560. T1 may be a fixed value or may be derived from a magnitude of an error signal. For example, T1 may be derived by comparing the feedback error signal to a predetermined threshold.

During the time T1, calibration of the in-phase channel 550 and the quadrature phase channel 560 due to the sources of frequency dependent imbalance is performed. For example, the first switch 518, the second switch 519 and the isolation circuit 534 are opened allowing the balancer 532 to calibrate the in-phase channel 550 and the quadrature phase channel 560 employing the FDIQC source 510. In the preferred embodiment, reducing the sources of frequency dependent imbalance is performed before decreasing (e.g., removing or substantially removing) the sources of frequency independent imbalance.

If it is determined that the time T1 has expired, then the sources of frequency dependent imbalance and frequency independent mismatch are connected in a step 440. In a preferred embodiment, the sources of frequency dependent imbalance and the frequency independent mismatch are connected by closing switches such as the first switch 518 and the second switch 519 of the quadrature mixing receiver 500 of FIG. 5. Furthermore, in the preferred embodiment, the isolation circuit 534 is also closed at the expiration of T1 and the balancer 532 and the equalizer 536 are connected.

After connecting the sources of frequency dependent imbalance and frequency independent mismatch, the frequency independent mismatch sources are decreased (e.g., removed or substantially removed) in a step 450. In the preferred embodiment, the sources of frequency independent mismatch are decreased by calibrating the in-phase channel 550 and the quadrature phase channel 560 employing the FIIQC source 530. The FIIQC source 530 may be single frequency signal generated by a conventional tone generator. In the preferred embodiment, the FIIQC source 530 may have a frequency of one-quarter of the digital sampling rate or digital clock frequency of the quadrature mixing receiver 500 plus the frequency of an oscillator 514. Typically, the digital clock frequency is about 20 MHz and the frequency of the oscillator 514 is about 2.4 GHz or 5 GHz depending on which IEEE 802.11 standard is employed.

After decreasing, a determination is made if a time T2 has expired in a second decisional step 460. If it is determined that the time T2 has expired, then calibrating the in-phase and the quadrature phase channels of the quadrature mixing receiver ends in a step 470. T2 may be determined based on the time required for the equalizer 536 to calibrate the in-phase channel 550 and the quadrature phase channel 560. T2 may be a fixed value or may be derived from a magnitude of an error signal. For example, T2 may be derived by comparing the feedback error to a predetermined threshold.

Returning now to the first decisional step 430, if the time T1 has not expired, then the method 400 proceeds to step 420 and continuous as before. Additionally, returning to the second decisional step 460, if the time T2 has not expired, then the method 400 proceeds to step 450 and the continuous as before.

Although the present invention has been described in detail, those skilled in the art should understand that they can make various changes, substitutions and alterations herein without departing from the spirit and scope of the invention in its broadest form.

What is claimed is:

1. A channel calibrator for use with a quadrature mixing receiver, comprising:

a balancer configured to reduce a frequency dependent imbalance between an in-phase channel and a quadrature phase channel associated with said receiver;

an equalizer configured to decrease a frequency independent mismatch between said in-phase channel and said quadrature phase channel; and an isolation circuit, coupled to said balancer and said equalizer, configured to separate said balancer and said equalizer during at least a portion of calibration of said in-phase channel and said quadrature phase channel.

2. The channel calibrator as recited in claim 1 wherein said isolation circuit is configured to separate said balancer and said equalizer when said in-phase channel and said quadrature phase channel are calibrated due to frequency dependent imbalance sources.

3. The channel calibrator as recited in claim 1 wherein said balancer employs a pair of linear phase finite-impulse-response pre-equalizers.

4. The channel calibrator as recited in claim 3 wherein said balancer includes a coefficient adapter employing a sign algorithm.

5. The channel calibrator as recited in claim 1 wherein said equalizer employs a single adaptive filter.

6. The channel calibrator as recited in claim 1 wherein said equalizer includes a coefficient adjuster employing an adaptive algorithm.

7. The channel calibrator as recited in claim 1 wherein said balancer employs a pair of adaptive filters.

8. A method of calibrating in-phase and quadrature phase channels for use with a quadrature mixing receiver, comprising:

separating a balancer from an equalizer during at least a portion of calibration of said in-phase channel and said quadrature phase channel, said balancer for reducing a frequency dependent imbalance between said in-phase channel and said quadrature phase channel and said equalizer for decreasing a frequency independent mismatch between said in-phase channel and said quadrature phase channel;

reducing said frequency dependent imbalance; and decreasing said frequency independent mismatch.

9. The method as recited in claim 8 further comprising separating sources of said frequency dependent imbalance and said frequency independent mismatch during calibration of said in-phase channel and said quadrature phase channel due to frequency dependent imbalance sources.

10. The method as recited in claim 9 wherein said calibration due to frequency dependent imbalance sources occurs for a specific time.

11. The method as recited in claim 10 wherein calibration due to frequency independent mismatch occurs after said specific time.

12. The method as recited in claim 11 wherein sources are connected before said calibration due to frequency independent mismatch.

13. The method as recited in claim 12 wherein said balancer and said equalizer are connected for said calibration due to frequency independent mismatch.

14. The method as recited in claim 10 wherein said specific time is derived from a magnitude of an error signal.

15. A quadrature mixing receiver for use with a wireless communications system, comprising:

a radio frequency front end;

a baseband signal processor; and a channel calibrator, including:

a balancer that reduces frequency dependent imbalance between an in-phase channel and a quadrature phase channel associated with said receiver, an equalizer that decreases frequency independent mismatch between said in-phase channel and said quadrature phase channel, and an isolation circuit, coupled to said balancer and said equalizer, configured to separate said balancer and said equalizer during at least a portion of calibration of said in-phase channel and said quadrature phase channel.

16. The quadrature mixing receiver as recited in claim 15 wherein said isolation circuit is configured to separate said balancer and said equalizer when said in-phase channel and said quadrature phase channel are calibrated due to frequency dependent imbalance sources.

17. The quadrature mixing receiver as recited in claim 15 wherein said balancer employs a pair of linear phase finite-impulse-response pre-equalizers.

18. The quadrature mixing receiver as recited in claim 15 wherein said balancer includes a coefficient adapter employing a sign algorithm.

19. The quadrature mixing receiver as recited in claim 15 wherein said equalizer employs a single adaptive filter.

20. The quadrature mixing receiver as recited in claim 15 wherein said equalizer includes a coefficient adjuster employing an adaptive algorithm.

21. The quadrature mixing receiver as recited in claim 15 wherein said balancer employs a pair of adaptive filters.

* * * * *